United States Patent
Tawara et al.

(10) Patent No.: US 7,263,565 B2
(45) Date of Patent: Aug. 28, 2007

(54) BUS SYSTEM AND INTEGRATED CIRCUIT HAVING AN ADDRESS MONITOR UNIT

(75) Inventors: Yasuhiro Tawara, Funabashi (JP); Junichi Nishimoto, Kawasaki (JP)

(73) Assignee: Renesas Technology Corp., Tokyo (JP)

( * ) Notice: Subject to any disclaimer, the term of this patent is extended or adjusted under 35 U.S.C. 154(b) by 80 days.

(21) Appl. No.: 11/213,795

(22) Filed: Aug. 30, 2005

(65) Prior Publication Data

US 2006/0080485 A1   Apr. 13, 2006

(30) Foreign Application Priority Data

Sep. 21, 2004  (JP) ............................. 2004-273226

(51) Int. Cl.
   G06F 13/00   (2006.01)
   G06F 13/36   (2006.01)
   G06F 17/00   (2006.01)
   G06F 13/40   (2006.01)

(52) U.S. Cl. .................... 710/110; 712/32; 361/683; 716/17

(58) Field of Classification Search ............ 710/110, 710/107, 113, 116, 38, 39, 52, 100, 316; 709/208, 709/245, 202, 253; 711/147, 100; 370/400, 370/431, 257, 351, 912; 712/32–33; 361/683, 361/686; 714/47; 716/17
See application file for complete search history.

(56) References Cited

U.S. PATENT DOCUMENTS 5,907,689 A * 5/1999 Tavallaei et al. ............ 710/110
6,052,763 A * 4/2000 Maruyama ................... 711/152
6,502,167 B1 * 12/2002 Tanaka et al. ............... 711/114
6,851,056 B2 * 2/2005 Evans et al. ................. 713/193
2006/0002309 A1 * 1/2006 Ban ............................ 370/254

FOREIGN PATENT DOCUMENTS

JP   2001-005726   1/2001
JP   2001-297054   10/2001

OTHER PUBLICATIONS

"Centralized management of configuration and monitor & control of a large SCPC DAMA network" by santo et al. (abstract only) Publication Date: Nov. 2-4, 1993.*

* cited by examiner

*Primary Examiner*—Gopal C. Ray
(74) *Attorney, Agent, or Firm*—Miles & Stockbridge PC

(57) ABSTRACT

A bus system for handling changes in an access address range of a subject-of-access or a bus master is disclosed. The bus system can have an address monitor unit including a table which is shared among a plurality of bus masters and stores therein access right information. By referencing the table, the presence or absence of an access right for each of the bus masters can be determined. The table may be rewritten as appropriate to handle address range changes.

5 Claims, 9 Drawing Sheets

FIG. 3

ENCODING OF response SIGNAL AND response_opcode SIGNAL

| NAME OF TRANSACTION | opcode (8 BITS) | response_opcode (8 BITS) | |
|---|---|---|---|
| | | NORMAL | ERROR |
| LOAD_8BYTE | 00110001 | 10000000 | 10000001 |
| STORE_8BYTE | 00110010 | 10000000 | 10000001 |

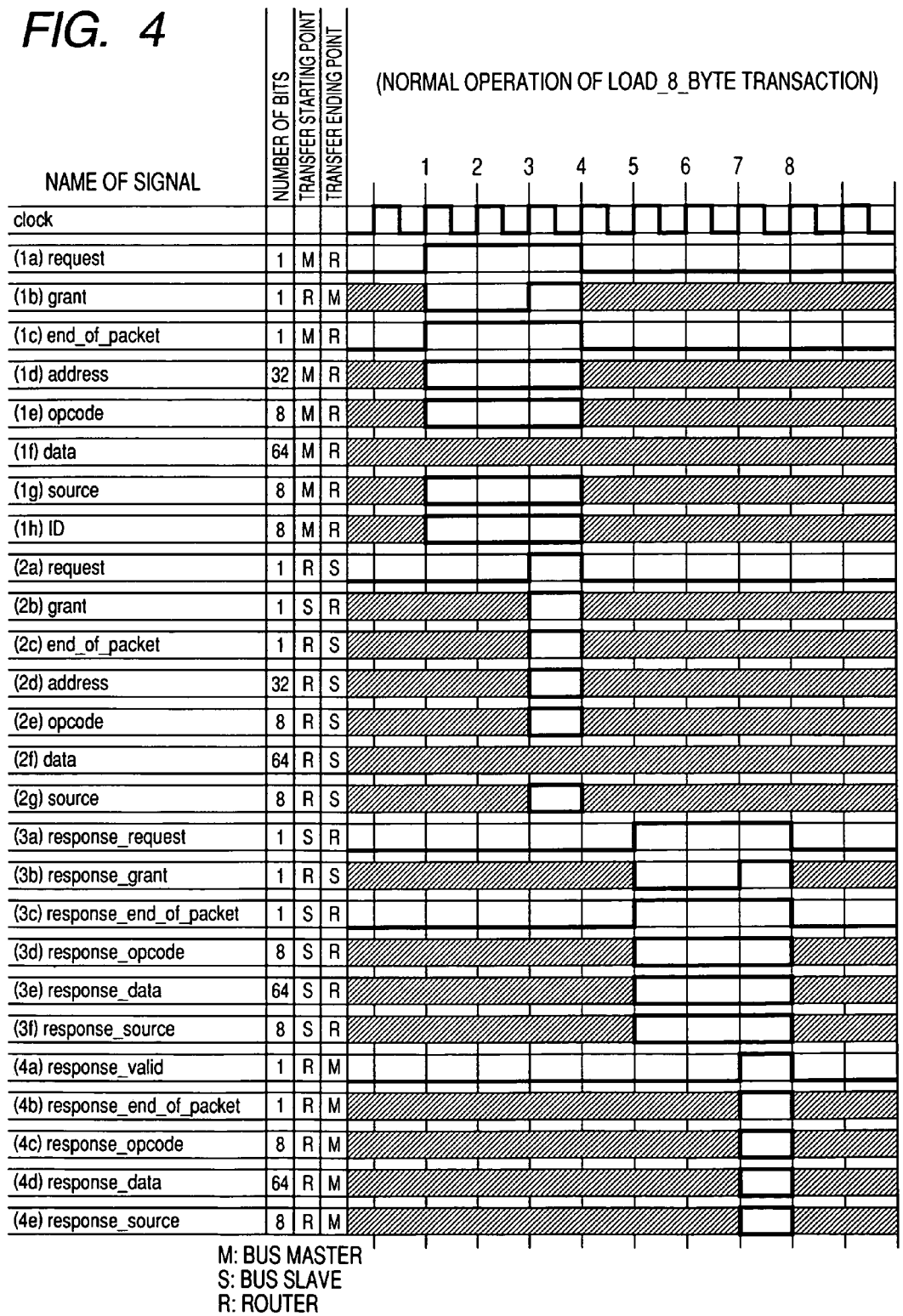

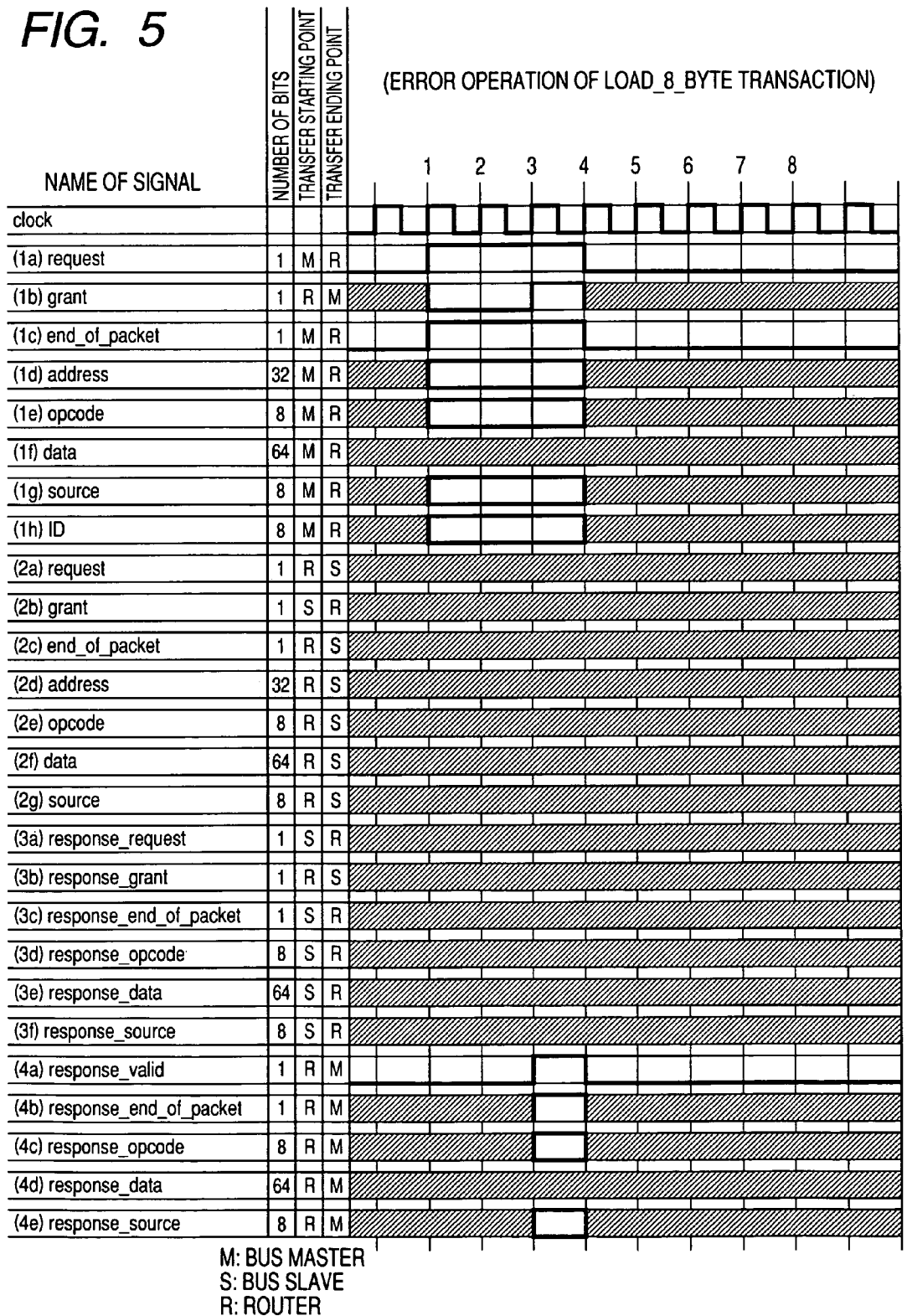

FIG. 6

(NORMAL OPERATION OF STORE_8_BYTE TRANSACTION)

| NAME OF SIGNAL | NUMBER OF BITS | TRANSFER STARTING POINT | TRANSFER ENDING POINT |
|---|---|---|---|
| clock | | | |
| (1a) request | 1 | M | R |
| (1b) grant | 1 | R | M |
| (1c) end_of_packet | 1 | M | R |
| (1d) address | 32 | M | R |
| (1e) opcode | 8 | M | R |
| (1f) data | 64 | M | R |
| (1g) source | 8 | M | R |
| (1h) ID | 8 | M | R |
| (2a) request | 1 | R | S |
| (2b) grant | 1 | S | R |
| (2c) end_of_packet | 1 | R | S |
| (2d) address | 32 | R | S |
| (2e) opcode | 8 | R | S |
| (2f) data | 64 | R | S |
| (2g) source | 8 | R | S |
| (3a) response_request | 1 | S | R |
| (3b) response_grant | 1 | R | S |
| (3c) response_end_of_packet | 1 | S | R |
| (3d) response_opcode | 8 | S | R |
| (3e) response_data | 64 | S | R |
| (3f) response_source | 8 | S | R |
| (4a) response_valid | 1 | R | M |
| (4b) response_end_of_packet | 1 | R | M |
| (4c) response_opcode | 8 | R | M |
| (4d) response_data | 64 | R | M |
| (4e) response_source | 8 | R | M |

M: BUS MASTER
S: BUS SLAVE
R: ROUTER

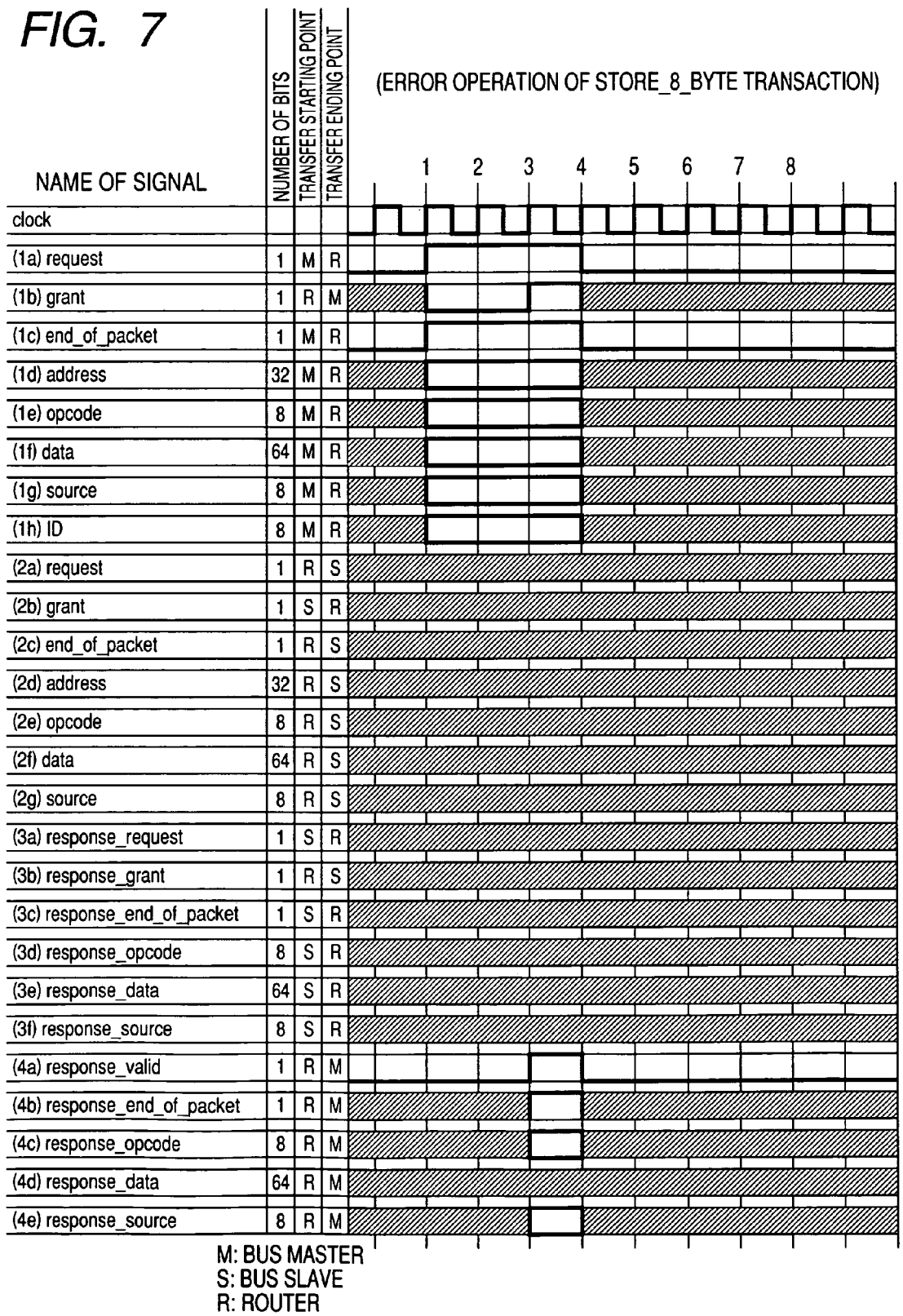

BUS SYSTEM AND INTEGRATED CIRCUIT HAVING AN ADDRESS MONITOR UNIT

CROSS-REFERENCE TO RELATED APPLICATION

The present application claims priority from Japanese patent application No. 2004-273226 filed on Sep. 21, 2004, the content of which is hereby incorporated by reference into this application.

BACKGROUND OF THE INVENTION

The present invention relates to a bus system and, more particularly, to a technology for controlling the access right of a hardware item connected to a bus, which is effective when applied to, e.g., a semiconductor integrated circuit.

As a technology for preventing a data region from being rewritten by an unauthorized access from a task in an extended memory address space apparatus, there has been known one disclosed in, e.g., Patent Document 1. According to the technology, a data region access right definition table which defines the enabling/disabling of access to a data region for a task (or an interruption process) being executed is provided in a cache. An address arithmetic unit extracts a data region ID from a CPU address inputted from a central processing unit (CPU). A register bank control unit references the foregoing definition table in the cache and judges the access right of the task being executed to the data region from the task ID (or the interruption number of the interruption process) of the task that has been stored in an ID register and from the extracted data region ID mentioned above. When the access is not enabled, a system error judgment is made and, if the access is enabled, the process of converting the foregoing CPU address to an extended address is performed.

There has also been known a technology disclosed in, e.g., Patent Document 2 as a technology for preventing the execution of data transfer to an unauthorized address such as an address to which a memory has not been allocated or an address used for another purpose in performing DMA transfer using a direct memory access controller (DMAC). According to the technology, when the DMA transfer is performed by using the DMAC, data stored in a store region at one address (source address) is sequentially read out and transferred to a store region at the other address (destination address) by referencing an address range used for a data transfer process between the memory and a peripheral circuit. Data indicative of one and the other addresses has been stored in address registers in the DMAC. At this time, a valid address range individually allocated to the memory or the peripheral circuit has been stored preliminarily in a valid address table such that a monitor unit compares the address range indicated by the data used for the transfer process that has been stored in the individual address registers with the address range stored in the valid address table in performing the transfer process and, when the address range indicated by the data used for the transfer process deviates from the valid address range, the transfer process is interrupted.

[Patent Document 1] Japanese Unexamined Patent Publication No. 2001-005726 (FIG. 2)

[Patent Document 2] Japanese Unexamined Patent Publication No. 2001-297054 (FIG. 2)

SUMMARY OF THE INVENTION

Since the technology disclosed in Patent Document 1 uses the CPU to locally judge access enabling or disabling and the technology disclosed in Patent Document 2 uses the DMAC to locally judge access enabling or disabling, when such a CPU and a DMA are connected to a common bus, the function of access right judgment is distributed to the CPU and the DMAC so that access right judging resources exist in overlapping relation. Accordingly, when the address range of the subject of access or any of bus masters is changed, a rewrite operation for maintaining the identities of the access right judging resources becomes troublesome. In a recent system, in particular, a large number of bus masters for MPEG processes, three dimensional graphics, an encryption process, and the like are connected to a common bus so that the problem caused by the distribution of the function of access right judgment to the individual bus masters becomes more conspicuous.

It is therefore an object of the present invention to provide a technology which allows, when a plurality of bus masters are connected to a common bus, easy handling of a change in the address range of the subject of access or any of bus masters.

The above and other objects and novel features of the present invention will become apparent from the description of the present specification and the accompanying drawings.

A brief description will be given to the outline of the representative aspects of the present invention disclosed in the present application.

Specifically, in a bus system including a bus to which a plurality of bus masters are commonly connected, there is provided an address monitor unit including a table which is shared among the plurality of bus masters and stores therein access right information that has been preset in correspondence to a subject of access and to address information corresponding thereto and capable of determining, by referencing the table, the presence or absence of an access right of each of the bus masters based on subject-of-access information of each of the bus masters and on the address information outputted from the bus master.

The address monitor unit references the table and determines the presence or absence of the access right for each of the bus masters based on the subject-of-access information of each of the bus masters and on the address information outputted from the bus master. The table is shared among the plurality of bus masters and stores therein the access right information that has been preset in correspondence to the subject of access and to the address information corresponding thereto. Since the table is shared among the plurality of bus masters, when the address range of the subject of access or any of the bus masters is changed, the table may be rewritten appropriately. That is, since the function of access right judgment has not been distributed to the individual bass masters, the change in the address range of the subject of access or any of the bus masters can easily be handled only by rewriting the table shared among the plurality of bus masters.

At this time, the address monitor unit is embedded in a router which allows routing for transferring a packet which can be transferred via the bus to a target hardware item uniquely determined by a destination address of the packet.

The address monitor unit can be comprised of: a first decoder capable of decoding the subject-of-access information received via the bus; a second decoder capable of decoding the address information inputted via the bus; a detecting circuit capable of detecting the access right information specified by an output of the first decoder and an output of the second decoder; and a judging circuit capable of outputting judgment information on the presence or absence of the access right to the bus based on a detection output of the detecting circuit.

Each of the plurality of bus masters can be provided with an ID register which holds the subject-of-access information such that it is outputtable to the bus as required.

A semiconductor integrated circuit can be formed to include: the bus system; and the plurality of bus masters coupled to the bus system.

At this time, the plurality of bus masters include a central processing unit and the table in the address monitor unit can be constituted to be rewritable by the central processing unit.

The subject-of-access information contained in the central processing unit can be a process ID used by the central processing unit for memory management.

The following is the brief description of effects achievable by the representative aspects of the invention disclosed in the present application.

That is, a technology can be provided which allows, when a plurality of bus masters are connected to a common bus, easy handling of a change in the address range of the subject of access or any of the bus masters.

BRIEF DESCRIPTION OF THE DRAWINGS

FIG. 3 is a view illustrating examples of the encoding of an opcode signal and a response_opcode signal in the foregoing microcomputer;

FIG. 4 is an operational timing chart when address monitoring means judges a normality in an 8-byte load in the foregoing microcomputer;

FIG. 5 is an operational timing chart when the address monitoring means judges an error in the 8-byte load in the foregoing microcomputer;

FIG. 6 is an operational timing chart when the address monitoring means judges a normality in an 8-byte store in the foregoing microcomputer; and FIG. 7 is an operational timing chart when the address monitoring means judges an error in the 8-byte store in the foregoing microcomputer.

DESCRIPTION OF THE PREFERRED EMBODIMENTS

An embodiment which adds address monitoring means to the router of a bus system is the best mode for carrying out the present invention. A router is means for viewing a destination address to which a packet that has been passed to the bus is to be transferred and sending the packet to a target hardware item which is uniquely determined by the address. In general, a packet is composed of the destination address, data to be transferred, and other control signals. In addition, the present embodiment allows an ID number to be set to the packet. Since the packet flowing on the bus inevitably passes through the router, the router is an optimum functional unit to which the address monitoring unit according to the present invention is to be added.

An access right table held by the address monitoring unit has bits commensurate with all ID numbers in each address range and each of the bits corresponds to any of the ID numbers. In each of the bits, whether or not the possessor of the ID number corresponding to the bit has an access right to the address range is stored as a value of 0 or 1. There are two methods of access to the access right table. The access right table has been address-mapped and is readable/writable by using a software item. It is also possible to select a row in the access right table based on the address range, select a column in the access right table based on the ID number, and read the bit at the intersection of the selected row and the selected column.

In addition to the destination address, the data to be transferred, and the other control codes, the ID number can also be set to the packet allowed to flow on the bus by each of the bus masters in the present embodiment. To physical components which allow such a packet to flow, an ID number signal line is added to an address signal line, a data signal line, and other control signal lines. Another method can also be considered which allows the ID number to flow on the control signal lines without adding the ID number signal line.

Each of the bus masters has one ID register for storing therein the ID number. The ID register has been address-mapped and is rewritable by using a software item. The ID number is preset to the ID register by using the software item before the bus master performs an inherently objective operation.

When a packet is allowed to flow on the bus by the bus master, the packet passes through the router and through the address monitoring unit in the router. The address monitoring unit acquires the destination address and ID number of the packet. The address monitoring unit judges the address range in the table in which the address is included and views the value of the bit corresponding to the ID number. The address monitoring unti judges an error or a normality based on whether the value of the bit is 0 or 1. A specific description will be given herein below to the embodiment of the present invention.

Figure 1:
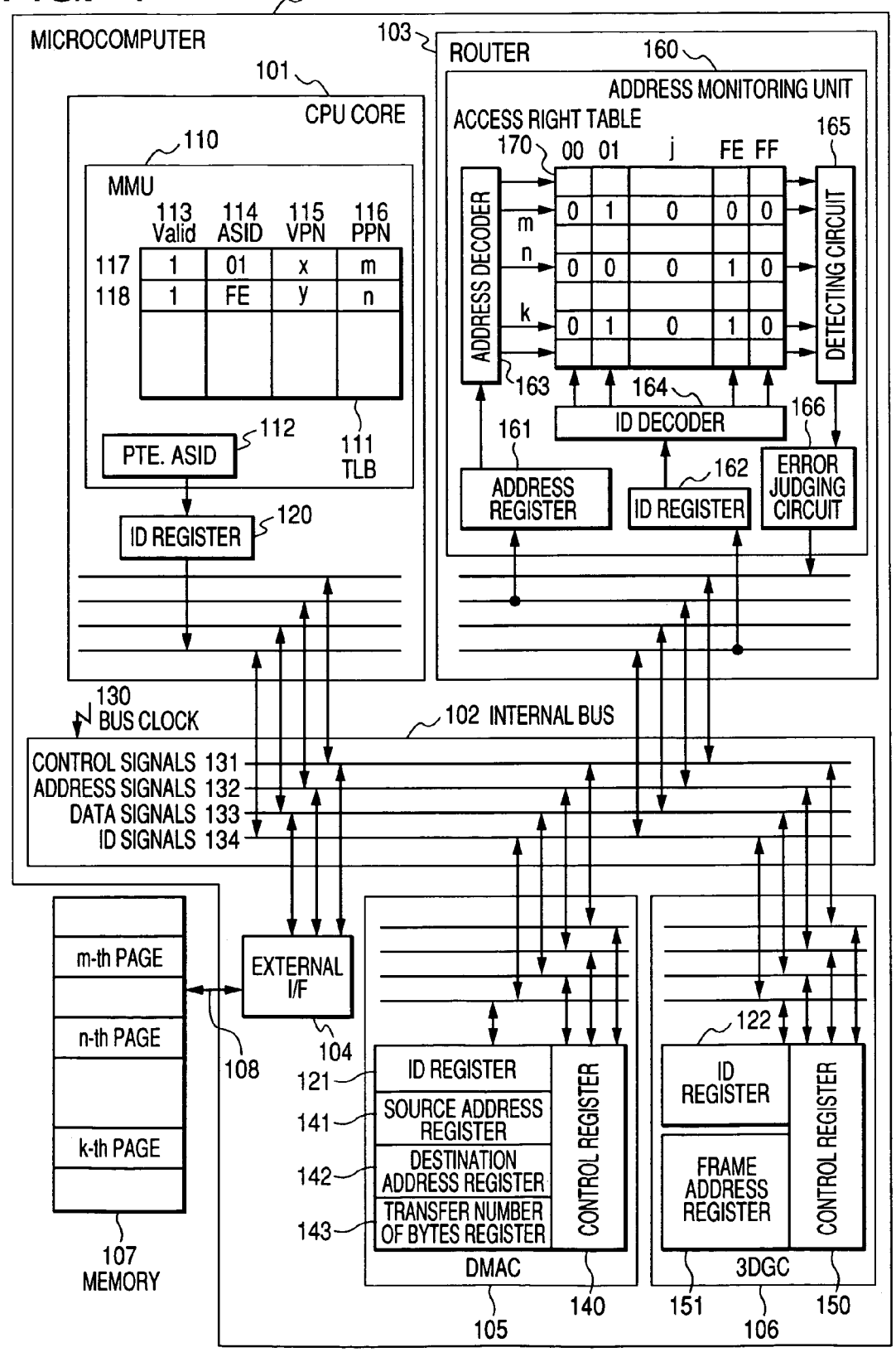
FIG. 1 is a block diagram of an exemplary entire structure of a microcomputer as an example of a semiconductor integrated circuit according to the present invention.

FIG. 1 shows a microcomputer as an example of a semiconductor integrated circuit according to the present invention. The microcomputer is formed on a single semiconductor substrate such as a monocrystalline silicon substrate by using a well-known semiconductor manufacturing technology, though there is no particular limit thereto. As the ID number to be set to the ID register of each of the bus masters, the present embodiment uses a virtual address space identification number managed by an operating system.

A microcomputer 100 includes: a CPU core 101; a router 103; an external I/F (external interface) 104; a DMAC (Direct Memory Access Controller) 105; and a 3DGC (3-Dimension Graphics Controller) 106, though there is no particular limit thereto. A memory 107 is assumed to be a DRAM (Dynamic Random Access Memory) disposed outside the microcomputer 100, though there is no particular limit thereto. The CPU core 100, the router 103, the external I/F 104, the DMAC 105, the 3DGC 106 are coupled to each other to be capable of transmitting a signal therebetween by using an internal bus 102. The memory 107 is connected to the external I/F 104 via a memory bus 108. The external I/F 104 is capable of connecting not only the memory 107 but also a plurality of memories or another semiconductor integrated circuit to the outside.

The CPU core 101 has the function of performing a specified arithmetic process in accordance with a predetermined program and is comprised of an MMU (Memory Management Unit) 110 and an ID (IDentification) register 120, though there is no particular limit thereto. The MMU 110 includes a TLB (Translation Lookaside Buffer) 111 and a PTE. ASID (Page Table Entry resister's Address Space Identification part) 112. The TLB 111 is composed of 64 rows and columns indicative of the components of the individual rows. The individual rows of the TLB 111 are termed entries, of which the 0-th and 1st entries are denoted by 117 and 118, respectively. Although the final one of the subsequent entries is the 63rd entry, the depiction thereof is omitted in FIG. 1. Each of the columns of the TLB 111 is composed of a Valid 113, an ASID (Address Space IDentification) 114, a VPN (Virtual Page Number) 115, a PPN (Physical Page Number) 116, and other bits. Since the other bits are not important, the description thereof will be omitted.

The component of the Valid 113 is one bit. The entry in which the value of the bit composing the Valid 113 is 1 is in use and has a valid content, while the entry in which the value of the bit composing the Valid 113 is 0 is out of use and has an invalid content. The component of the ASID 114 is an address space identification number, which is assumed herein to be an 8-bit integral value with no sign. An ASID number is a number for identifying a virtual address space which is provided for each process on a one-by-one basis and is generally termed a process ID number or the like. The virtual address space is divided into pages (Pages) each of a prescribed size. The size is indicated by a power-of-2 number and is selected among the sizes of 1 Mbytes, 64 Mbits, and the like. The component of the VPN 115 indicates the ordinal position of the page when the virtual address space starting at the 0-th address has been divided into the pages of the size and stores a page number in use or having a high possibility of being used in the virtual address space indicated by the ASID number. A physical address space is divided into the same size into which the virtual address space has been divided. The component of the PPN 116 indicates the ordinal position of the page when the physical address space starting at the 0-th address has been divided into the pages of the size. Summarizing the foregoing, a description will given to the entry 117. Since the Valid bit has a logic value "1", the entry 117 has a valid value and associates the x-th page in the virtual address space of which the ASID number is 01 with the m-th page in the physical address space. The presence of the entry 117 causes the MMU 110 to convert, when a process having the virtual address space identification number (ASID number) of 01 accesses the p-th word on the x-th page in the virtual address space, the access in the virtual address space to access to the p-th word on the m-th page in the physical address space. Since the Valid bit in the entry 118 is 1, the entry has a valid value and associates the y-th page in the virtual address space of which the ASID number is FE with the n-th page in the physical address space. The presence of the entry 118 causes the MMU 110 to convert, when a process having the virtual address space identification number of FE accesses the q-th word on the y-th page in the virtual address space, the access in the virtual address space to access to the q-th word on the n-th page in the physical address space.

The PTE. ASID 112 stores therein the identification number of the virtual address space for which the arithmetic process is currently being executed by the CPU core 101. The PTE. ASID represents an ASID region in the PTE register and is composed of one or more bits.

The ID register 120 has the same value as the PTE. ASID 112. The CPU core 101 is a bus master and outputs the value in the ID register 120 to ID signals 134 on outputting a packet to the bus.

The internal bus 102 is a mechanism which transfers the packet outputted from the bus master to the internal bus. The packet is comprised of a control instruction, the destination address, the data to be transferred, and the ID number, though there is no particular limit thereto. These are transmitted by the internal bus 102 as control signals 131, address signals 132, data signals 133, and ID signals 134, in synchronization with a bus clock 130. These signals are connected to the CPU core 101, the router 103, the external I/F 104, the DMAC 105, and the 3DGC 106. To the CPU core 101, the router 103, the external I/F 104, the DMAC 105, and the 3DGC 106, respective specific address ranges have been allocated preliminarily. The router 103 has the function of transferring the packet to the destination address thereof.

The external I/F 104 receives the packet comprised of the control signals 131, the address signals 132, and the data signals 133, converts the received packet to a signal corresponding to the type of the memory connected externally to the microcomputer, such as an SRAM or a DRAM, outputs the signal resulting from the conversion to the external bus 108, and performs a read or write operation with respect to a specified address in the memory 107. The external I/F 104 is a bus slave. Although the bus slave is capable of receiving the packet initiated by a bus master, there is no such case where the packet is initiated by the bus slave so that the bus slave only outputs a response packet to the received packet to the bus. The possessor of the response packet is the bus master. The bus slave need not store an ID number and has no ID register.

The DMAC 105 has the function (direct memory access control function) of controlling data transfer performed between itself and the memory 107 without interposition of the CPU core 101 and is comprised of a control register 140, an source address register 141, a destination address register 142, a transfer number-of-bytes register 143, and the ID register 121, though there is no particular limit thereto. Addresses are allocated to the source address register 141, the destination address register 142, the transfer number-of-bytes register 143, and the ID register 121 and data can be read or written by specifying an address from the program being executed by the CPU core. A start flag for the control register 140 is set to 1 in the state in which data has preliminarily been written in the source address register 141, destination address register 142, and transfer number-of-bytes register 143 of the DMAC 105 by using a program and a transfer method and the like have preliminarily been specified to the control register 140. As a result, the content of the memory is transferred by the transfer number of bytes from the source address to the destination address. To the ID register 121, the CPU core 101 sets the same ID number as the virtual address space identification number of the process which controls the DMAC 105 by using a program such as a driver. The DMAC 105 is a bus master and outputs the value in the ID register 121 to the ID signals 134 on outputting a packet to the bus.

The 3DGC 106 has the function of controlling a three dimensional graphic process and is comprised of a control register 150, a frame address register 151, and an ID register 122, though there is no particular limit thereto. Addresses are allocated to the control register 150, the frame address register 151, and the ID register 122 and data can be read or written by specifying an address from the program being executed by the CPU core. The 3DGC 106 receives a control instruction and a parameter at the control register 150 and is capable of performing a data read or write operation with respect to a specified location in a memory region shown in the frame address register 151. To the ID register 122, the CPU core 101 sets the same ID number as the virtual address space identification number of the process which controls the 3DGC 106 by using a program such as a driver. The 3DGC 106 is a bus master and outputs the value in the ID register 122 to the ID signals 134 on outputting a packet to the bus.

The router 103 has a routing function for transferring the packet that can be transferred via the internal bus 102 to a target hardware item uniquely determined by the destination address of the packet. The router 103 is provided with address monitoring unit 160. The address monitoring unit 160 has an access right monitoring function based on the inputted address signal and is comprised of an address register 161, an ID register 162, an address decoder 163, an ID decoder 164, a detecting circuit 165, an error judging circuit 166, and an access right table 170, though there is no particular limit thereto. Addresses have been allocated to the access right table 170 and data can be read or written by specifying any of the addresses from the program executed by the CPU core 101. When the router 103 receives a packet, the address monitoring unit 160 stores the address signal of the packet in the address register 161 and stores the ID signal of the packet in the ID register 162. Then, the value in the address register 161 is decoded in the address decoder 163 and one of the rows in the access right table 170 is selected by an output of the address decoder 163. In parallel to this, the value in the ID register 162 is decoded by the ID decoder 164 and one of the columns in the access right table 170 is selected by an output of the ID decoder 164. The detecting circuit 165 detects the value of the bit at the intersection of the selected row and the selected column in the access right table 170 and inputs the detected value to the error judging circuit 166. The error judging circuit 166 allows the router to continue a normal process without outputting an error when the logic value "1" is inputted, while outputting the error signal to the control signals 131 on the internal bus 102 when the logic value "0" is inputted. Here, the address monitoring unit 160 described above corresponds to the address monitor unit according to the present invention.

Figures 2, 2A, 2B, 2C:
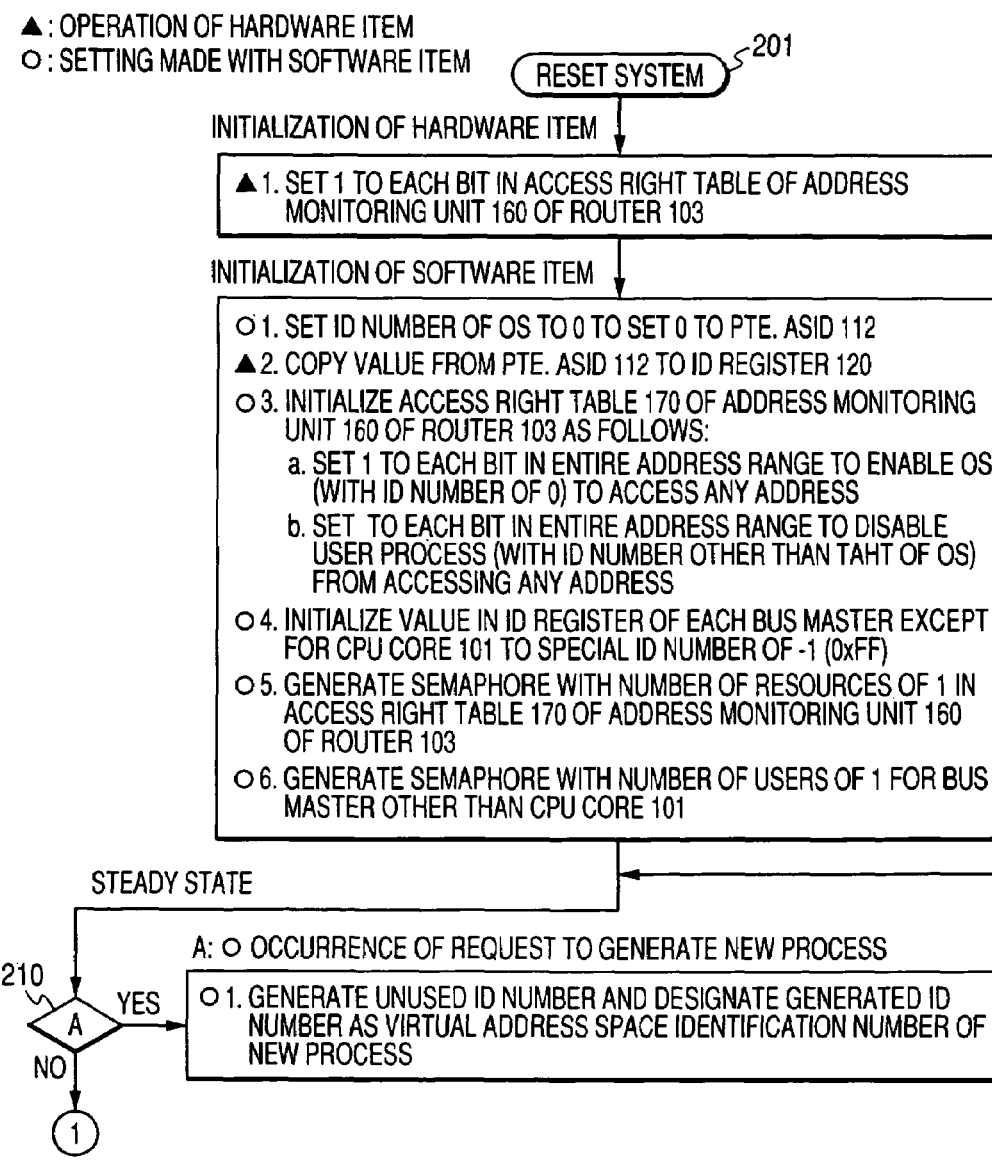
FIG. 2 is a flow chart showing a main operation in the foregoing microcomputer.
Figure 2B:
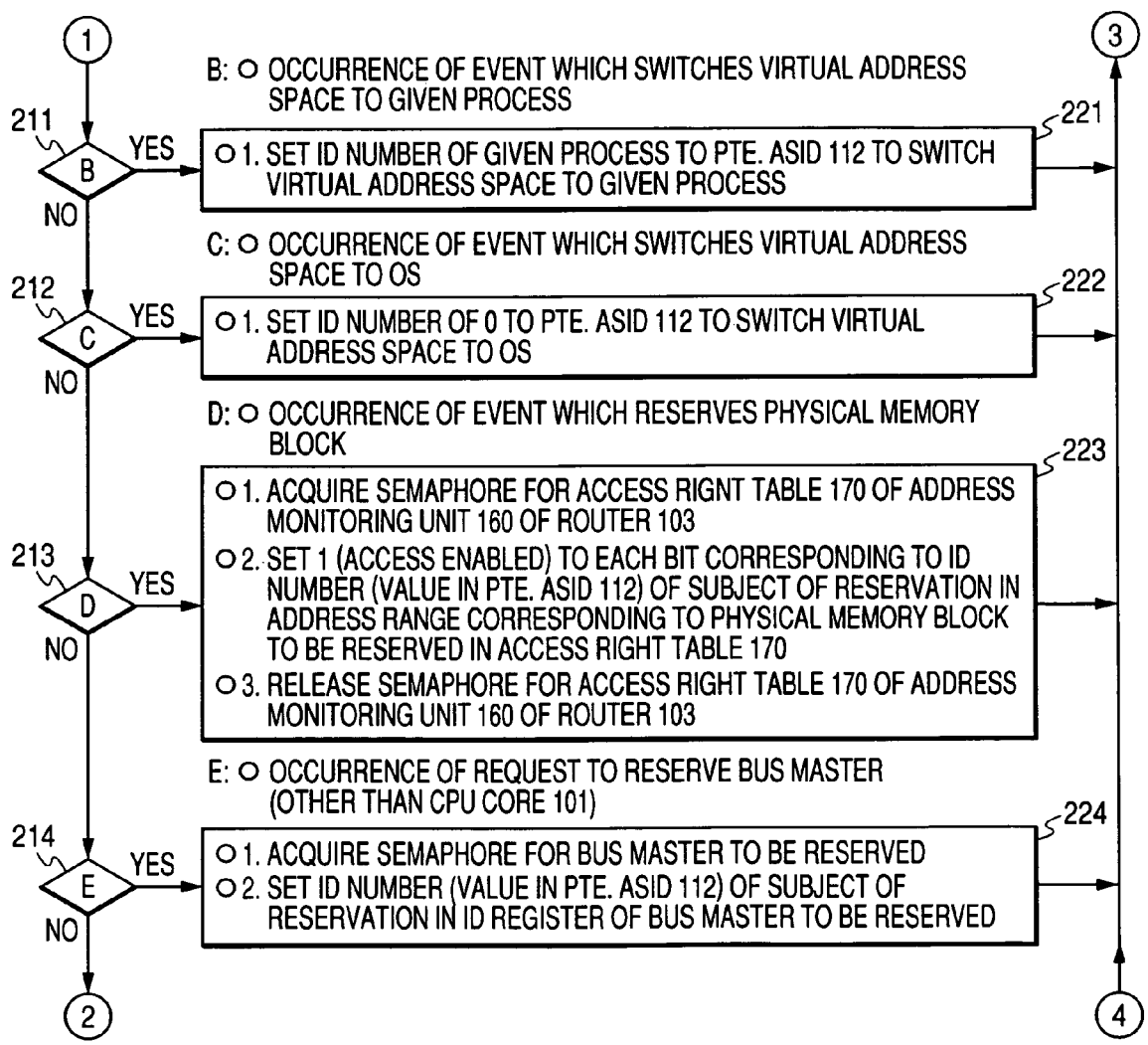
Figure 2C:
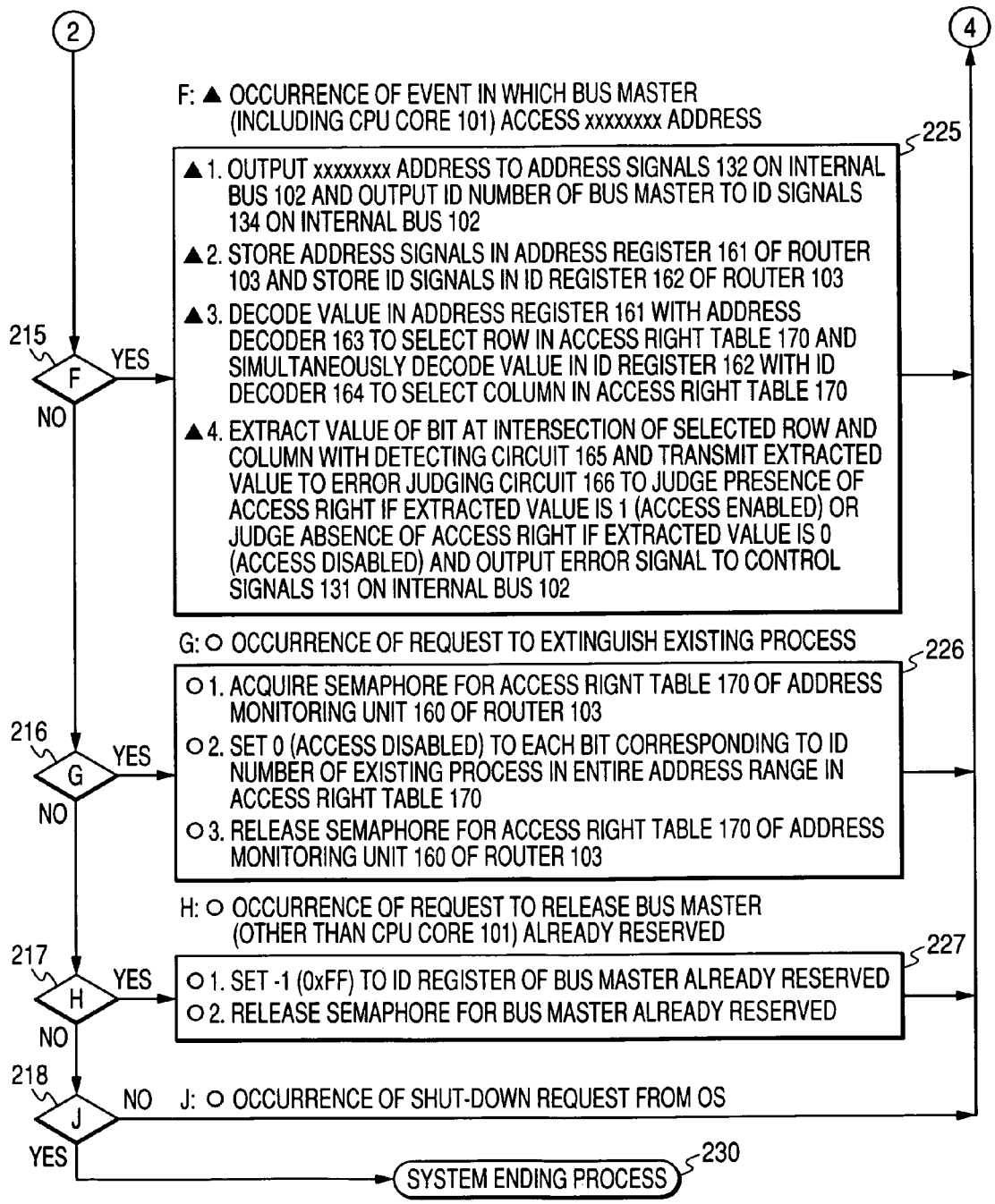

FIG. 2 shows a main operation in the microcomputer 100 described above. In FIG. 2, each of the procedures following the triangular marks is assumed to be the operation of a hardware item and the procedures following the circular marks are assumed to be settings made by using a software item.

In a system reset 201, the microcomputer 100 is brought into an initial state when the microcomputer 100 is first energized or when the microcomputer 100 receives a reset request signal.

A process 202 is initialization using a hardware item after the system reset 201. The first procedure of the process 202 is the initialization of the access right table 170 of the address monitoring unit 160 of the router 102. In the present embodiment, each of the bits in the access right table 170 is set to the logic value "1" such that the same operation as in the case where the address monitoring unit 160 is not provided, similarly to the case with the conventional microcomputer, is performed. In this case, settings are made to enable access using any ID number to any address. The initial value in the access right table 170 may be changed appropriately depending on the system. It will easily be appreciated that a system reset procedure is performed in addition to the first procedure of the process 202.

A process 203 is initialization using a software item.

In the first procedure of the process 203, the virtual address space identification number of an OS including an exceptional process handler is set to 00. Although the present embodiment uses the value of the current virtual address space identification number stored in the PTE. ASID 112 by copying it to the ID register 120 of the CPU core 101, it is also possible to allocate an OS-dedicated special value as the virtual address space identification number with the view to distinguishing the OS from a normal process.

In the second procedure of the process 203, the hardware item copies the value in the PTE. ASID 112 therefrom to the ID register 120 of the CPU core 101.

In the procedure A of the third procedure of the process 203, the initialization is performed to enable the OS to access all the addresses. In the procedure B of the third procedure of the process 203, the initialization is performed to disable a user process with any of ungenerated virtual address space identification numbers including −1(0×FF) from accessing any of the addresses.

In the fourth procedure of the process 203, −1(0×FF) is set as the virtual address space identification number to the ID register of each of the bus masters except for the CPU core 101. It is assumed that the virtual address space identification number −1(0×FF) is a special number which is not used as the virtual address space identification number. The present embodiment sets −1(0×FF) to the ID register 121 of the DMAC 105 and sets −1(0×FF) to the ID register 122 of the 3DGC 106.

In the fifth procedure of the process 203, a semaphore acquired when a read or write operation is performed exclusively to the access right table 170 by using a software item is generated. The semaphore used herein is a mechanism for providing synchronization in a multi-task OS in which a plurality of processes are simultaneously executed and defined as a type of flag which manages the occupied state of a resource.

In the sixth procedure of the process 203, a semaphore acquired when a read or write operation is performed exclusively to the ID register of any of the bus masters other than the CPU core 101 by using a software item is generated.

When the process 203 is ended, the initialization of the OS is completed and the OS comes into a steady state (a normal state). The steady state is basically an infinite loop which performs a specified process in response to the occurrence of an event or a request.

In a judgment 210, a process 220 is executed when a request to generate a new process occurs.

In the first procedure of the process 220, an unused ID number is generated and designated as the virtual address space identification number of the new process.

In a judgment 211, when a request to switch the virtual address space to a given process occurs, a process 221 is executed.

In the first procedure of the process 221, the ID number of the given process is set to the PTE. ASID 112 so that the virtual address space is switched to the given process. In the second procedure of the process 221, the value in the PTE. ASID 112 is copied therefrom to the ID register 120 by using a hardware item.

When a request to switch the virtual address space to the OS occurs in the judgment 212, a process 222 is executed.

In the first procedure of the process 222, 0 is set to the PTE. ASID 112 so that the virtual address space is switched to the OS. In the second procedure of the process 222, the value in the PTE. ASID 112 is copied therefrom to the ID register 120 by using a hardware item.

In a judgment 213, when an event which reserves a physical memory block (a page of the physical address space) occurs, a process 223 is executed in addition to a procedure for actually reserving the physical memory. The event which reserves the physical memory block occurs in such cases: (1) where the OS preliminarily allocates the page of the physical address space to the page of the virtual address space to prevent the occurrence of a page fault on switching the address space; (2) where the page fault occurs and the page of the physical address space is allocated to the page of the virtual address space in which the page fault has occurred; and (3) where a system call for acquiring a physical address block is made. In each of the cases (1) and (2), the ID number of the virtual address space with the page fault is used. In the case (3), the ID number of the virtual address space which has made the system call is used.

In the first procedure of the process 223, a semaphore for the access right table 170 is acquired. This semaphore has been generated in the fifth procedure of the process 203. In the second procedure of the process 223, 1 is set to the bit at the intersection of the row corresponding to the address range of the physical memory block reserved in the access table 170 and the column with the ID number. In the third procedure of the process 223, the semaphore for the access right table 170 is released.

In a judgment 214, when an event which reserves any of the bus masters other than the CPU core 101 occurs, a process 224 is executed.

In the first procedure of the process 224, a semaphore for the bus master is acquired. It is to be noted that this semaphore has been generated in the sixth procedure of the process 203. In the second procedure of the process 224, the virtual address space identification number which uses the bus master is set to the ID register of the bus master. In the procedure, the bus master has the same access right as the virtual address space. For example, the DMAC 105 which is one of the bus masters has the determined number of resources so that they are managed by using the semaphore and a driver program for acquiring the DMAC 105 is produced. This driver program acquires a semaphore for the DMAC 105, while setting the virtual address space identification number of a process as the subject of the reservation of the DMAC to the ID register 121 of the DMAC 105. The same shall apply to the 3DGC 106.

In a judgment 215, when an event in which the bus master accesses the "xxxxxxxx address" occurs, a process 225 is executed by a hardware item.

In the first procedure of the process 225, the xxxxxxxx address is outputted to the address signals 132 and the value in the ID register of the bus master is outputted to the ID signals 134. At the same time, the control signals are transmitted via the control signals 131 and, if necessary, data is outputted to the data signals 133. In the second procedure of the process 225, the router 103 stores the address in the address register 161 and stores the value of the ID signals in the ID register 162. In the third procedure of the process 225, the value in the address register 161 is decoded in the address decoder 163 and the corresponding one of the rows in the access right table 170 is selected, while the value in the ID register 162 is decoded simultaneously in the ID decoder 164 and the corresponding one of the columns in the access right table 170 is selected. In the fourth procedure of the process 225, the value of the bit at the intersection of the selected row and the selected column is extracted in the detecting circuit 165 and outputted to the error judging circuit 166. If the value is 1, the normal operation is continued. If the value is 0, the error signal is outputted to the control signals 131.

In a judgment 216, when a request to extinguish the existing process occurs, a process 226 is executed.

In the first procedure of the process 226, a semaphore for the access right table 170 of the address monitoring unit 160 of the router 103 is acquired. In the second procedure of the process 226, each of the bits in the column corresponding to the ID number of the process in the access right table 170 is set to 0, whereby access using the ID number is disabled. In the third procedure of the process 226, the semaphore is released.

In a judgment 217, when an event which releases any of the bus masters other than the CPU core 101 occurs, a process 227 is executed.

In the first procedure of the process 227, $-1(0 \times FF)$ is set to the ID register of the bus master. In the second procedure of the process 227, the semaphore that has been acquired in the process 224 is released and, if there is a release procedure specific to the bus master, it is executed.

In a judgment 218, when a shut-down request to the OS occurs, the process flow shifts to a terminal 230. If there is no shut-down request, the process flow returns to the judgment 210 and repeats the same process as described above.

As shown in the entry 117 in the TLB 111, the x-th logic page of the process with the virtual address space identification number (ASID) 01 has been allocated to the m-th physical page in the memory 107 through the initial allocation of the physical page to the logic page of the process or by a page fault recovery process. At the same time, by setting 1 to the 01-th column in the m-th row in the access right table 170, access using the same ID number as the virtual address space identification number (ASID) 01 to the m-th physical page in the memory 107 has been enabled.

Likewise, as shown in the entry 118 in the TLB 111, the y-th logic page of the process with the virtual address space identification number (ASID) FE has been allocated to the n-th physical page in the memory 107 through the initial allocation of the physical page to the logic page of the process or by the page fault recovery process. At the same time, by setting 1 to the FE-th column in the n-th row in the access right table 170, access using the same ID number as the virtual address space identification number (ASID) FE to the n-th physical page in the memory 107 has been enabled.

Although the k-th page in the memory 107 has no particular description of the entries in the TLB 111, the k-th row in the access right table 170 has set 1 to each of the 01-th column and the FE-th column in the access right table 170 since the process with the virtual address space identification number (ASID) 01 has acquired an access right through a system call and the process with the virtual address space identification number (ASID) FE has also acquired an access right through a system call. As a result, access to the k-th physical page in the memory 107 using either of the virtual address space identification umber (ASID) 01 and the virtual address space identification umber (ASID) FE has been enabled.

The 00-th column in the access right table 170 shows the access right of the OS with the ID number of 0 so that 1 has been set to each of the bits corresponding to all the address ranges in which the resources validly exist.

The FF-th column in the access right table 170 shows the access right of the bus master with the ID number of $-1$, i.e., FF. The bus master having $-1$(FF) as the ID number does not have an access right to any of the resources.

In the state of the access right table 170 shown in FIG. 1, when the virtual address space identification number of the current process (present process) in the CPU core 101 is 01, the m-th page and the k-th page in the memory 107 are accessible. When the virtual address space identification number of the current process in the CPU core 101 is FE, the n-page and the k-page in the memory 107 are accessible. When the virtual address space identification number of the current process in the CPU core 101 is j, none of the m-th page, the n-th page, and the k-page in the memory 107 is accessible. When the virtual address space identification number of the current process in the CPU core 101 is 00, all the existing resources are accessible. When the virtual address space identification number of the current process in the CPU core 101 is FF, all the resources are inaccessible.

In the state of the access right table 170 shown in FIG. 1, when the value in the ID register 121 of the DMAC 105 is 01, the m-page and the k-th page in the memory 107 are accessible. When the value in the ID register 121 of the DMAC 105 is FE, the n-page and the k-th page in the memory 107 are accessible. When the value in the ID register 121 of the DMAC 105 is j, none of the m-th page, the n-th page, and the k-th page in the memory 107 is accessible. When the value in the ID register 121 of the DMAC 105 is 00, all the exiting resources are accessible. When the value in the ID register 121 of the DMAC 105 is FF, all the exiting resources are inaccessible.

In the state of the access right table 170 shown in FIG. 1, when the value in the ID register 122 of the 3DGC 106 is 01, the m-page and the k-th page in the memory 107 are accessible. When the value in the ID register 122 of the 3DGC 106 is FE, the n-page and the k-th page in the memory 107 are accessible. When the value in the ID register 122 of the 3DGC 106 is j, none of the m-th page, the n-th page, and the k-th page in the memory 107 is accessible. When the value in the ID register 122 of the 3DGC 106 is 00, all the exiting resources are accessible. When the value in the ID register 122 of the 3DGC 106 is FF, all the exiting resources are inaccessible.

As described above, not only the access right of the CPU core 101 but also the access right of each of the bus masters such as the DMAC 105 and the 3DGC 106 can be controlled by using the access monitoring unit.

FIG. 4 shows a normal case in an 8-byte load. FIG. 5 shows an error case in the 8-byte load. FIG. 6 shows a normal case in an 8-byte store. FIG. 7 shows an error case in the 8-byte store.

The internal bus 102 performs transfer in synchronization with the bus clock 130. Data transferred in one clock cycle is termed a cell. A packet is composed of one or more cells. On the internal bus 102, a circuit requesting transfer is termed a bus master, while a circuit responding to the transfer is termed a bus slave. A transaction on the internal bus is initiated by the transmission of a request packet containing the content of a request from the bus master to the bus slave. The transaction is completed by the transmission of a response packet containing the content of a response from the bus slave to the bus master. A circuit positioned between the bus master and the bus slave to relay the packets is the router 103. The router 103 transfers the request packet received from one bus master to a specified bus slave. The router 103 also transmits the response packet received from one bus slave to the bus master that has initiated the transaction.

A clock signal corresponds to the bus clock 130 and the logic values "0" and "1" are alternately repeated with a given cycle period. In synchronization with the rising edge of this clock signal, the other signals, which will be described later, are fetched by the bus master, the router, and the bus slave.

One transaction from a given bus master to a given bus slave is completed by: (1) the transmission of a request packet from the bus master to the router 103; (2) the transmission of the request packet from the router 103 to the bus slave; (3) the transmission of a response packet from the bus slave to the router 103; and (4) the transmission of the response packet from the router 103 to the bus slave, which are performed in this order. If an error is detected in the error judging circuit 166, however, only the transmissions (1) and (4) are executed. A detailed description will be given herein below to the transmissions (1) to (4) mentioned above.

In the foregoing transmission (1) from the bus master to the router 103, there are used: a request signal (1*a*); a grant signal (1*b*); an end_of_packet signal (1*c*); an address signal (1*d*); an opcode signal (1*e*); a data signal (1*f*); a source signal (1*g*); and an ID signal (1*h*). Among them, the request signal (1*a*) indicates that, of the signals used by the bus master to transfer the request packet, the address signal (1*d*), the opcode signal (1*e*), the data signal (1*f*), the source signal (1*g*), and the ID signal (1*h*) are outputting valid values, while the grant signal (1*b*) indicates to the bus master that the router 103 can receive the request packet. On the rising edge of the clock signal, when each of the request signal (1*a*) and the grant signal (1*b*) has the logic value "1", the cell or cells of the request packet are transferred from the bus master (M) to the router 103 (R). When the request signal (1*a*) has the logic value "0", the cell or cells are not transferred (which is ignored by the router 103). The end_of_packet signal (1*c*) indicates that the bus master is outputting the final cell of the request packet. The address signal (1*d*) indicates the destination address of the transaction. The opcode signal (1*e*) indicates the type and transfer size of the transaction. An example of the encoding of the opcode signal (1*e*) is shown in the opcode column in FIG. 3. The data signal (1*f*) represents data transferred from the bus master to the router 103. The source signal (1*g*) is an identifier outputted from the bus master to specify, when the router 103 relays the response packet, the destination of the response packet. The ID signal (1*h*) is an ID number transferred from the bus master to the router 103.

In the foregoing transmission (2) from the router 103 (R) to the bus slave (S), there are used: a request signal (2*a*); a grant signal (2*b*); an end_of_packet signal (2*c*); an address signal (2*d*); an opcode signal (2*e*); a data signal (2*f*); and a source signal (2*g*). Among them, the request signal (2*a*) indicates that, of the signals used for the transfer of the request packet from the router 103 to the bus slave, the end_of_packet signal (2*c*), the address signal (2*d*), the opcode signal (2*e*), the data signal (2*f*), and the source signal (2*g*) are outputting valid values. The grant signal (2*b*) indicates that the bus slave can receive the request packet. On the rising edge of the clock signal, when each of the request signal (2*a*) and the grant signal (2*b*) has the logic value "1", the cell or cells of the request packet are transferred from the router 103 to the bus slave. When the request signal (2*a*) has the logic value "0", the cell or cells are not transferred. The end_of_packet signal (2*c*) indicates that the router 103 is outputting the final cell. The address signal (2*d*) indicates the destination address of the transaction. The opcode signal (2*e*) indicates the type and transfer size of the transaction. An example of the encoding of the opcode signal (2*e*) is shown in the opcode column in FIG. 3. The data signal (2*f*) represents data transferred from the router 103 to the bus master. The source signal (2*g*) is an identifier outputted from the bus master to specify, when the router 103 relays the response packet, the destination of the response packet.

In the foregoing transmission (3) from the bus slave to the router 103, there are used: a response_request signal (3*a*); a response_grant signal (3*b*); a response_end_of_packet signal (3c); a response_opcode signal (3d); a response_data signal (3e); and a response_source signal (3f). Among them, the response_request signal (3a) indicates that, of the signals used by the bus slave to transfer the response packet, the response_opcode signal (3d), the response_data signal (3e), and the response_source signals (3f) are outputting valid values. On the rising edge of the clock signal, when each of the response_request signal (3a) and the response_grant signal (3b) has the logic value "1", the cell or cells of the response packet are transferred from the bus slave to the router 103. When the response_request signal (3a) has the logic value "0", the cell or cells are not transferred (which is ignored by the router 103). The response_grant signal (3b) indicates that the router 103 can receive the response packet. On the rising edge of the clock signal, when each of the response_request signal (3a) and the response_grant signal (3b) has the logic value "1", the cell or cells of the response packet are transferred from the bus slave to the router 103. When the response_grant signal (3b) has the logic value "0", the cell or cells are not transferred. The response_end_of_packet signal (3c) indicates that the bus slave is outputting the final cell of the response packet. The response_end_of_packet signal (3c) is valid when the logic value thereof is "1" and is invalid when the logic value thereof is "0". The response_end_of_packet signal (3c) falls to the logic value "0" when the logic value of the response_request signal (3a) is "0". The response_opcode signal (3d) indicates the result of the transaction. An example of the encoding of the response_opcode signal (3d) is shown in the response_opcode column in FIG. 3. The response_data signal (3e) represents data transferred from the bus slave to the router 103. The response_source signal (3f) is an identifier for allowing the specification of the target bus master of the response packet when the router 103 routes the response packet. Upon receipt of the request packet, the bus slave stores the value of the source signal (2g) and outputs the stored value as the response_source signal (3f) on transmitting the corresponding response packet.

In the foregoing transmission (4) from the router 103 to the bus master, there are used: a response_valid signal (4a); a response_end_of_packet signal (4b); a response_opcode signal (4c); a response_data signal (4d); and a response_source signal (4e). Among them, the response_valid signal (4a) indicates that the response_end_of_packet signal (4b), the response_opcode signal (4c), the response_data signal (4d), and the response_source signal (4e), which are used for the transfer of the response packet from the router 103 to the bus master, are outputting valid values. On the rising edge of the clock signal, when the response_valid signal (4a) has the logic value "1", the cell or cells of the response packet are transferred from the router 103 to the bus master (M). The response_end_of_packet signal (4b) indicates that the router 103 is outputting the final cell of the response packet. The response_end_of_packet signal (4b) is valid when the logic value thereof is "1" and is invalid when the logic value thereof is "0". The response_opcode signal (4c) indicates the result of the transaction. An example of the encoding of the response_opcode signal (4c) is shown in the response_opcode column in FIG. 3. When an error occurs in the error judging circuit 166 of the address monitoring unit 160, in particular, the code of the error is set. The response_data signal (4e) represents data transferred from the router 103 to the bus master. The response_source signal (4e) has the same value as the source signal (1g) outputted from the bus master upon the transmission of the corresponding request packet.

In FIG. 1, the internal bus 102 is composed of: the control signals 131; the address signals 132; the data signals 133; and the ID signals 134. The control signals 131 is designated herein as a generic name for the following group of signals. Specifically, the control signals 131 is designated as the generic name for: the request signal (1a); the grant signal (1b); the end_of_packet signal (1c); the opcode signal (1e); the source signal (1g); the request signal (2a); the grant signal (2b); the end_of_packet signal (2c); the opcode signal (2e); the source signal (2g); the response_request signal (3a); the response_grant signal (3b); the response_end_of_packet signal (3c); the response_opcode signal (3d); the response_source signal (3f); the response_valid signal (4a); the response_end_of_packet signal (4b); the response_opcode signal (4c); and the response_source signal (4e).

The address signals 132 are a generic name for the address signals (1d) and the address signals (2d).

The data signals 133 are a generic name for the data signals (1f), the data signals (2f), the response_data signals (3e), and the response_data signals (4d).

The ID signals 134 correspond to the ID signal (1h).

The foregoing embodiment can achieve the following operation and effect.

(1) Since the access right table 170 is shared among a plurality of bus masters such as the CPU core 101, the DMAC 105, and the 3DGC 106, when the address range of the subject of access or any of the bus masters is changed, the access right table 170 may be rewritten appropriately under the control of the CPU core 101. In other words, since the function of access right judgment has not been distributed to the individual bus masters, a change in the address range of the subject of access or any of the bus masters can easily be handled only by rewriting the access right table 170 shared among the plurality of bus masters mentioned above.

(2) The router 103 inherently has the function of transferring a packet to the destination address thereof and, by providing the router 103 having such a function with the address monitoring unit 160, it becomes possible to use common parts to compose different registers and the like. Accordingly, the number of elements can be reduced compared with the case where the address monitoring unit 160 is formed distinctly from the router 103.

Although the invention achieved by the present inventors has been described specifically, the present invention is not limited thereto. It will easily be appreciated that various changes and modifications can be made in the invention without departing from the gist thereof.

For example, although the foregoing embodiment has provided the ID register 120 distinctly from the PTE. ASID 112 and copied the value in the PTE. ASID 112 therefrom to the ID register 120 by using a hardware item, another embodiment can be implemented by modifying the foregoing embodiment such that the PTE. ASID 112 and the ID register 120 are formed as one hardware resource.

Instead of automatically copying the value from the PTE. ASID 112 to the ID register 120 by using the hardware item, the ID number may also be written in the ID register 120 using a software item or a hardware item by referencing the value in the PTE. ASID 112. In this case, as the ID number to be set to the ID register 120, an ID number with a granularity different from that of the virtual address space identification number can be set. On the other hand, the ID numbers with the same granularity are used in the ID register 120 of the CPU core 101, in the ID register 121 of the DMAC 105, in the ID register 122 of the 3DGC 106, and in the columns of the access right table 170 of the router 103.

Although the foregoing description has been given primarily to the case where the invention achieved by the present inventors is applied to the microcomputer which is an application field serving as the background of the invention, the present invention is not limited thereto. The present invention can be applied widely to various semiconductor integrated circuits.

The present invention can be applied under the condition that a bus is contained therein.

What is claimed is:

1. A bus system comprising:
   a bus to which a plurality of bus masters are each connected; and
   an address monitor unit including:
   a table which is shared among said plurality of bus masters and stores therein access right information that has been preset in correspondence to a subject-of-access and associated address information;
   a first decoder capable of decoding subject-of-access information received via said bus;
   a second decoder capable of decoding address information inputted via said bus;
   a detecting circuit capable of detecting the access right information specified by an output of said first decoder and an output of said second decoder; and
   a judging circuit capable of outputting judgment information on the presence or absence of the access right to said bus based on a detection output of said detecting circuit,
   wherein the address monitor unit is adapted to determine, by referencing said table, the presence or absence of an access right for each bus master based on the subject-of-access information and address information outputted from said bus master, and
   wherein said address monitor unit allows routing for transferring a packet which can be transferred via said bus to a target hardware item uniquely determined by a destination address of said packet.

2. A bus system according to claim 1, wherein each of said plurality of bus masters includes an ID register which holds the subject-of-access information such that it is outputtable to said bus as required.

3. A semiconductor integrated circuit formed over a single semiconductor substrate and including a bus system which comprises:
   a bus to which a plurality of bus masters are each connected; and
   an address monitor unit including:
   a table which is shared among said plurality of bus masters and stores therein access right information that has been preset in correspondence to a subject-of-access and associated address information;
   a first decoder capable of decoding subject-of-access information received via said bus;
   a second decoder capable of decoding address information inputted via said bus;
   a detecting circuit capable of detecting the access right information specified by an output of said first decoder and an output of said second decoder; and
   a judging circuit capable of outputting judgment information on the presence or absence of the access right to said bus based on a detection output of said detecting circuit,
   wherein the address monitor unit is adapted to determine, by referencing said table, the presence or absence of an access right for each bus master based on the subject-of-access information and address information outputted from said bus master, and
   wherein said address monitor unit allows routing for transferring a packet which can be transferred via said bus to a target hardware item uniquely determined by a destination address of said packet.

4. A semiconductor integrated circuit according to claim 3,
   wherein said plurality of bus masters include a central processing unit, and said table in said address monitor unit is rewritable by said central processing unit.

5. A semiconductor integrated circuit according to claim 4, wherein the subject-of-access information contained in said central processing unit is a process ID used by said central processing unit for memory management.

* * * * *